United States Patent
Tayloe et al.

[11] Patent Number: 6,157,638
[45] Date of Patent: Dec. 5, 2000

[54] HIGH DENSITY PACKET SWITCH WITH HIGH SPEED INTERFACES AND METHOD FOR USING SAME

[75] Inventors: Daniel Richard Tayloe, Phoenix; Peter Joseph Armbruster; Kajana Aswath Rao, both of Chandler, all of Ariz.

[73] Assignee: Motorola, Inc., Schaumburg, Ill.

[21] Appl. No.: 09/046,012

[22] Filed: Mar. 23, 1998

[51] Int. Cl.$^7$ .............................. H04Q 19/00; H04L 12/28
[52] U.S. Cl. ........................... 370/358; 370/389; 370/463; 340/825.79
[58] Field of Search ..................................... 370/357, 358, 370/359, 386, 388, 389, 419, 463; 340/826, 825.79, 825.8; 710/70

[56] References Cited

U.S. PATENT DOCUMENTS

| | | | |
|---|---|---|---|
| 4,679,191 | 7/1987 | Nelson et al. | 370/355 |
| 4,804,956 | 2/1989 | Boxall | 340/825.79 |
| 5,185,736 | 2/1993 | Tyrrell et al. | 370/358 |
| 5,751,711 | 5/1998 | Sakaue | 370/431 |
| 5,852,609 | 12/1998 | Adams, III et al. | 370/465 |
| 5,987,543 | 11/1999 | Smith | 710/70 |

OTHER PUBLICATIONS

IEEE Standard for Low–Voltage Differential Signals (LVDS) for Scalable Coherent Interface (SCI), IEEE, New York, 1996, All pages.

*Primary Examiner*—Alpus H. Hsu
*Assistant Examiner*—Afsar M. Qureshi
*Attorney, Agent, or Firm*—Harold C. McGurk; James E. Klekotka

[57] ABSTRACT

A high speed packet switch (100) is provided which uses a fabric size of 128×128 and operates at a 2.5 Gbps rate. Parallel data transport techniques are used to obtain the 2.5 Gbps data rate while operating internal switches (160) at slower rates. The packet switch fabric is fabricated on a single ASIC using high speed CMOS.

11 Claims, 2 Drawing Sheets

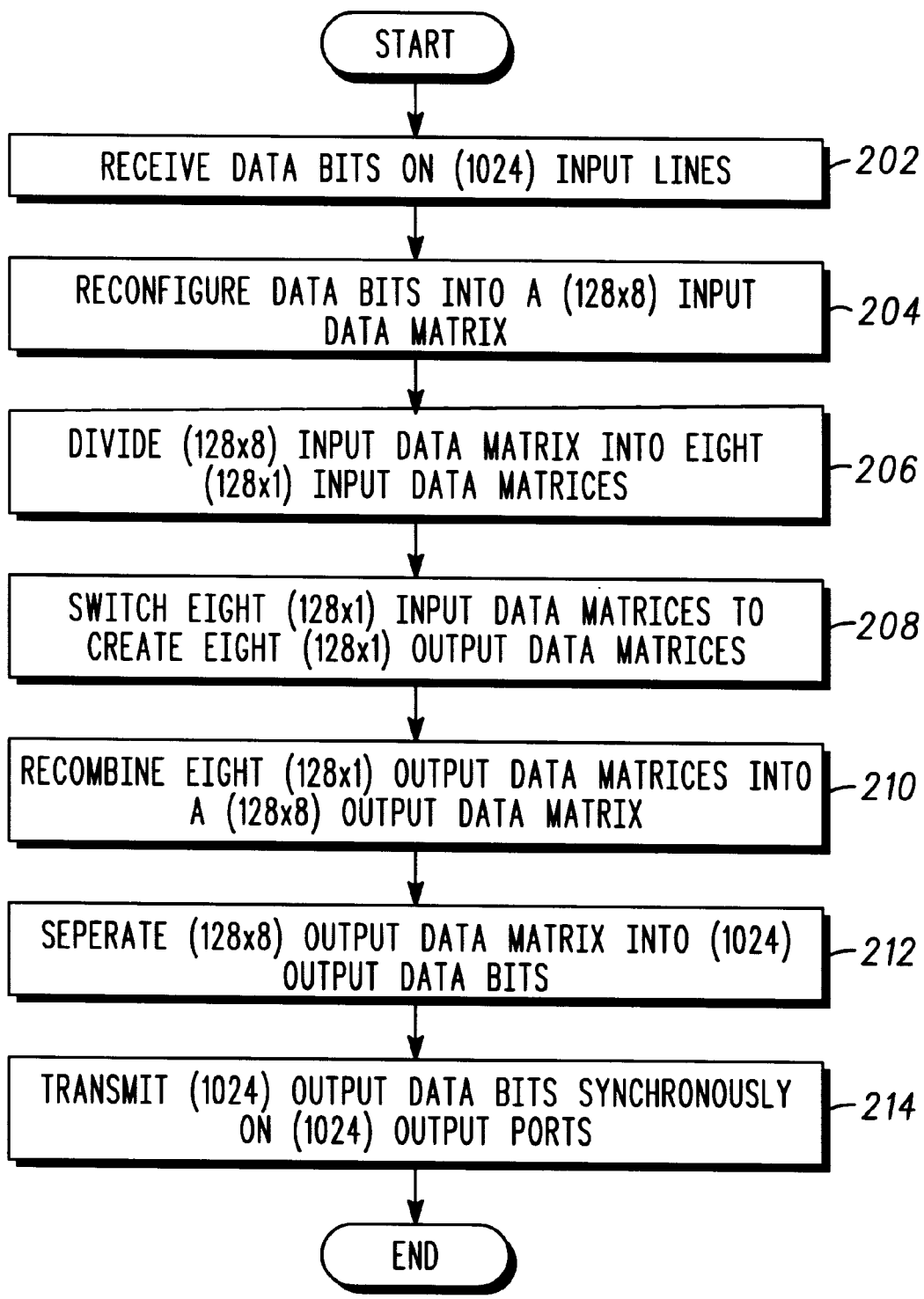

HIGH DENSITY PACKET SWITCH WITH HIGH SPEED INTERFACES AND METHOD FOR USING SAME

FIELD OF THE INVENTION

This invention relates generally to telecommunication switches and, more particularly, to packet switches.

BACKGROUND OF THE INVENTION

The need to move increasing amounts of data from one location to another at higher transfer rates has lead to the development of several standard approaches. One of these approaches is known as Asynchronous Transfer Mode (ATM) in which 53-byte cells are used to move data packets from one location to another.

The currently available large ATM switches are in the 20 to 160 gigabits per second (Gbps) range. These switches are actually composed of a number of small, single stage switches ganged together to form a larger switching matrix, referred to as a multistage switch. The typical transfer rate for the small, single stage switching elements is typically around 5 Gbps.

When many smaller switches are combined together to produce a large switch, inefficiencies result. For example, a multistage switch requires as much as six times as much switching fabric as a larger single stage switch for the same amount of capacity.

In addition, the currently available single stage switches are primarily configured with eight inputs and eight outputs. Some currently available single stage switches are configured with eight inputs and eight outputs. Typically, the data rates for the inputs are usually at either the 155 Mbps OC-3 rates or the 622 Mbps OC-12c rates, where OC indicates an optical signal. The Synchronous Optical Network (SONET) hierarchy is based on a fundamental unit which is equal to 51.84 Mbps. For example, an OC-1 nomenclature implies a 51.84 Mbps rate, and an OC-3 input implies a 1.5 Mbps rate (3*51.84 Mbps).

The 8×8 fabric size that is typically used is convenient for two reasons. First, there are a number of products available which implies lower costs. Secondly, the serial data rates involved force optical fiber interconnects between the basic switching fabric and the other cards, and fiber optic transmitters and receivers are available to support the 8×8 configuration.

What is needed is a larger packet switch module which will decrease the size of the resulting switching equipment by having simpler control capabilities.

BRIEF DESCRIPTION OF THE DRAWINGS

FIG. 2 illustrates a method of operating a high density packet switch with high speed interfaces in accordance with a preferred embodiment of the invention.

DETAILED DESCRIPTION OF A PREFERRED EMBODIMENT

Figure 1:
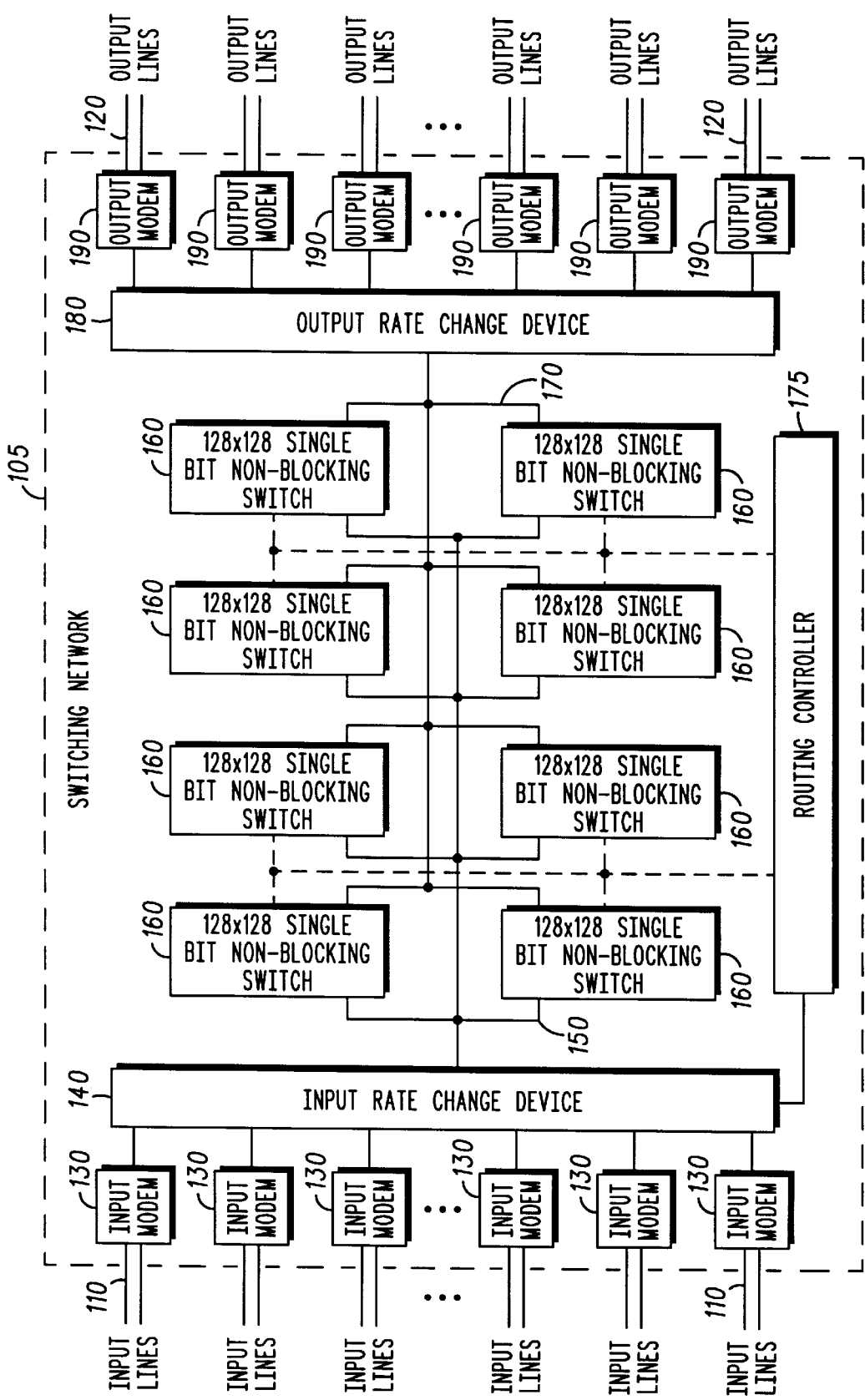
FIG. 1 shows a simplified block diagram of a high density packet switch with high speed interfaces in accordance with a preferred embodiment of the invention.

In a packet switching system, a path is established through the switching fabric prior to packets being switched. Once the path is set up, a switch begins consuming packets from the input ports and directs them to the correct output ports as specified in a routing table. When multiple packets are destined for the same output port, a packet switching system uses an arbitration procedure for determining which packet is transferred first. Buffers can be used to facilitate the arbitration procedure.

A packet switching system can include a number of different types of switches. For example, an Asynchronous Transfer Mode (ATM) network can include three different classes of switches: edge switches, access switches, and core switches.

Typically, edge switches are responsible for interfacing to customer premise equipment (CPE) such as a Local Area Network (LAN). In the ATM network, the edge switch converts the CPE interface to an ATM compatible interface. Edge switches also provide a User Network Interface (UNI) protocol and support a Network to Network Interface (NNI).

Access switches are typically used for multiplexing multiple edge switches into higher rate paths. An access switch may handle both individual virtual circuits and virtual paths. An access switch supports the NNI protocol to both the edge and the core switches.

Core switches are generally at the center of an ATM network. Core switches are used for switching high traffic volumes. Core switches are typically used for multiplexing a number of access switches into higher data rate paths. A core switch operates at the virtual path level, and it supports the NNI protocol for inter-switch communications.

FIG. 1 shows a simplified block diagram of a high density packet switch with high speed interfaces in accordance with a preferred embodiment of the invention. In a preferred embodiment, high density packet switch 100 is used as a core switch, although this is not required for the invention.

In a preferred embodiment, high density packet switch 100 supports at least a 320 Gbps data rate. High density packet switch 100 uses 128 channels operating at OC-48 speeds, although this is not required for this invention. In alternate embodiments, the number of channels does not have to be equal to 128. In other embodiments, multiple switches 100 can be interconnected to form larger switching fabrics.

In a preferred embodiment, high density packet switch 100 comprises a number of Low Voltage Differential Signaling (LVDS) input lines 110, a number of LVDS output lines 120, and a switching network 105 coupled between LVDS input lines 110 and LVDS output lines 120.

In a preferred embodiment, switching network 105 transports a constant packet size synchronously through packet switch 100, although this is not required for the invention. In alternate embodiments, the packet size does not have to remain constant.

In a preferred embodiment, high density packet switch 100 comprises 1024 input lines 110 and 1024 output lines 120, although this is not required for the invention. Alternate embodiments can be constructed having a different number of input lines 110 and a different number of output lines 120.

In a preferred embodiment, 1024 input lines 110 are configured into 128 input groups, although this is not required for the invention. Each input group is further defined as having four bits, and each bit is defined as having two input lines 110. Alternate embodiments can be constructed having a different organizational structure.

In a preferred embodiment, 1024 output lines 120 are configured into 128 output groups, although this is not required for the invention. Each output group is further defined as having four bits, and each bit is defined as having two output lines 120. Alternate embodiments can be constructed having a different organizational structure.

In a preferred embodiment, input lines 110 are coupled to a number of input modems 130, although this is not required for the invention. In alternate embodiments, different input devices could be used. Two input lines 110 are connected to the input side of each of the input modems 130.

In a preferred embodiment, input modems 130 are LVDS devices, although this is not required for the invention. LVDS is a serial interface methodology that operates at rates above 1.0 Gbps for distances of over ten meters. The signals are differential, and these signals require two 50 Ohm controlled impedance transmission lines per bit. Alternate embodiments can be constructed using different devices.

In a preferred embodiment, 512 LVDS input modems 130 are used, although this is not required for the invention. In alternate embodiments, the number of modems does not have to be equal to 512.

In a preferred embodiment, input modems 130 have output ports which are coupled to input rate change device 140, although this is not required for the invention. In this case, input rate change device 140 comprises a number of shift registers and a number of input latches.

In a preferred embodiment, input rate change device 140 is coupled to input bus 150, although this is not required for the invention. In this case, input bus 150 is configured as a 128×8 network. Alternate embodiments can be constructed using different input bus structures.

In a preferred embodiment, input bus 150 is coupled to the input ports of eight 128×128 single bit non-blocking switches 160, although this is not required for the invention. In this case, each switch 160 has 128 inputs and 128 outputs. Alternate embodiments can be constructed using different switch structures.

In a preferred embodiment, output bus 170 is coupled to the output ports of switches 160. In this case, output bus 170 is configured as a 128×8 network. Alternate embodiments can be constructed using different output bus structures.

In a preferred embodiment, output rate change device 180 is coupled to output bus 170. In this case, output rate change device 180 comprises a number of shift registers and a number of output latches.

In a preferred embodiment, output rate change device 180 is coupled to the input side of each of the output modems 190. In this case, output modems 190 are LVDS devices. Alternate embodiments can be constructed using different device types.

In a preferred embodiment, two output lines 120 are connected to the output side of output modem 190, although this is not required for the invention. In alternate embodiments, output ports, such as output lines 120, can be configured differently.

In a preferred embodiment, routing controller 175 is coupled to input rate change device 140 and eight 128× 128×1 switches, although this is not required for the invention. Alternate embodiments can be constructed without routing controller 175 included.

Alternate embodiments can be also be constructed in which buffers are included. Buffers could be used to eliminate congestion problems.

In a preferred embodiment, high density packet switch 100 receives packets (cells) on each clock cycle. Each received packet contains routing information in its header. Routing controller 175 uses the routing information to establish paths through switches 160.

In a preferred embodiment, high density packet switch 100 is being fabricated on a single Application Specific Integrated Circuit (ASIC), although this is not required for the invention. In alternate embodiments, two or more ASICs could be used. For example, power dissipation can be more easily managed using multiple ASICs.

In a preferred embodiment, packet switch 100 is fabricated using high speed Complementary Metal Oxide Semiconductor (CMOS) devices, although this is not required for the invention. In this case, high speed CMOS is used to obtain the packing density required for this complexity. Alternate embodiments, could use other materials such as GaAs.

In a preferred embodiment, high density packet switch 100 is being used in a packet switching application. In this case, high density packet switch 100 supports a 2.5 GHz to 3.0 GHz data stream. Each input can be independently connected to each one of the outputs.

FIG. 2 illustrates a method of operating a high density packet switch with high speed interfaces in accordance with a preferred embodiment of the invention.

In step 202, data bits are received on 1024 input lines. In alternate embodiments, a number of input lines are provided based on the designed operational speed for the network within which the switch is intended to operate. In a preferred embodiment, the switch operates at a 2.5 Gbps rate. Parallel paths are provided through the switch to obtain this overall data throughput rate.

In step 204, the data bits are reconfigured into a 128×8 input data matrix. In effect, a rate conversion is performed in which two four-bit groups are further processed into an eight-bit parallel (stacked) data structure.

In step 206, the 128×8 input data matrix is divided into eight 128×1 input data matrices. In this case, a 128×8 input bus structure is divided into eight 128×1 input bus structures.

In step 208, the eight 128×1 input data matrices are switched synchronously through a set of eight switches. This allows eight bits to pass through the switches at a time. Each switch is used to pass one bit at a time. In this manner, eight 128×1 output data matrices are created at the switch output ports.

In step 210, the eight 128×1 output data matrices are recombined into a 128×8 output data matrix. In this case, a 128×8 output bus structure is formed from eight 128×1 output bus structures.

In step 212, the 128×8 output data matrix is separated into 1024 output data bits.

In step 214, the 1024 output data bits are synchronously transmitted on 1024 output lines. In this case, the 1024 output lines represent 128 output groups having four bits per group and two lines per bit.

In a preferred embodiment, data is transport through the switch in 64-byte packets. In this case, header information is processed for each 64-byte packet. The header information is processed to obtain path information through the switch for 128 different paths. The header information is also processed so that synchronization can be established for the 128 paths. This allows 128 64-byte packets to synchronously move through the switch.

In a preferred embodiment, the switch is used to interface OC-48 input data streams where OC indicates an optical signal (carrier). The Synchronous Optical Network (SONET) hierarchy is based on a fundamental unit which is equal to 51.84 Mbps. For example, an OC-1 nomenclature implies a 51.84 Mbps rate, and an OC-48 input implies a 2.5 Gbps rate (48*51.84 Mbps).

In a preferred embodiment, the switches are non-blocking so that any input can be connected to any output at a particular switching time. In this case, the input data as seen at the switch input is contention-free. This means that the data packets moving through the switch have been pre-processed so that only one data packet obtains access to a particular transmission path at a particular time.

In a preferred embodiment, the data passing through the switch is organized into 64-byte packets, although this is not required for the invention. In this case, the 64-byte packet includes a 53-byte ATM cell along with routing and priority data bits. In alternate embodiments, different packet sizes could be used.

In a preferred embodiment, the 64-byte packet moves through the switch without loss. In this case, no data bits are stripped from the 64-byte packet. In alternate embodiments, data bits could be stripped from the packet by the switch. For example, these bits could be stripped from the packet to perform routing.

In a preferred embodiment, buffering is accomplished on a bit level, although this is not required for the invention. In alternate embodiment, byte wide buffering could be provided within packet switch 100.

In a preferred embodiment, packet switch 100 is used in a virtual path switching application. This means that the packet switch could be used as one part of a data pipe between ATM system end (termination) points. In an ATM system, before data can be transferred, a setup procedure must be performed. Likewise, when the data transfer session is completed, a termination procedure must be performed. Header information in an ATM cell identifies both virtual paths and virtual connections.

In summary, a high speed packet switch and a method of operating have been described. The invention has been described above with reference to a preferred embodiment. However, those skilled in the art will recognize that changes and modifications can be made in this preferred embodiment without departing from the scope of the invention. For example, the block diagram and steps identified herein can be categorized and organized differently than described herein while achieving equivalent results. In addition, the number of switches, the input structure, and the output structure could be different from that described in the preferred embodiment. These and other changes and modifications which are obvious to those skilled in the art are intended to be included within the scope of the invention.

What is claimed is:

1. A packet switch with high speed interfaces for transporting OC-48 input data streams, said switch comprising:

a plurality of input modems coupled to a number of Low Voltage Differential Signaling (LVDS) input lines, said number of LVDS input lines comprising at least sixty-four input groups, each input group having at least four input bits, each input bit comprising two LVDS input lines;

a plurality of input rate change devices coupled to said input modems, said input rate change devices performing rate conversions in which two four-bit groups are processed into an eight-bit parallel data structure;

an input bus coupled to said input rate change devices, said input bus being configured as a 128×8 network, wherein said input bus supports at least sixty-four channels which are at least eight bits wide;

a high speed switch coupled to said input bus, wherein said high speed switch comprises at least eight 128×128×1 non-blocking switches and operates at a rate greater than 350 MHz;

a output bus coupled to outputs of said high speed switch, said output bus being configured as a 128×8 network, wherein said output bus supports at least sixty-four channels which are at least eight bits wide;

a plurality of output rate change devices coupled to said output bus, said output rate change devices performing rate conversions in which an eight-bit parallel data structure is processed into two four-bit groups; and a plurality of output modems coupled to said output rate change devices, said output modems being coupled to a number of LVDS output lines, said number of LVDS output lines comprising at least sixty-four output groups, each output group having at least four output bits, each output bit comprising two LVDS output lines.

2. The packet switch as claimed in claim 1, wherein said packet switch further comprises a plurality of buffers, said buffers being used to eliminate congestion.

3. The packet switch as claimed in claim 2, wherein said buffers further comprise bit-wide buffers.

4. The packet switch as claimed in claim 2, wherein said buffers further comprise byte-wide buffers.

5. The packet switch as claimed in claim 1, wherein said packet switch transports data using sixty-four byte packets, wherein a sixty-four byte packet includes a fifty-three byte ATM cell along with routing and priority data bits.

6. The packet switch as claimed in claim 1, wherein said input rate change devices further comprise a number of shift registers and a number of input latches.

7. The packet switch as claimed in claim 1, wherein said packet switch further comprises an input-to-output routing controller coupled to said input rate change devices and to said high speed switch, said routing controller using header information to establish paths through said high speed switch.

8. The packet switch as claimed in claim 1, wherein said input modems comprise LVDS devices.

9. The packet switch as claimed in claim 1, wherein said output modems comprise LVDS devices.

10. The packet switch as claimed in claim 1, wherein said packet switch further comprises a single CMOS ASIC device.

11. The packet switch as claimed in claim 1, wherein said packet switch further comprises two CMOS ASIC devices.

* * * * *